United States Patent
Ancora et al.

(10) Patent No.: US 8,310,944 B2
(45) Date of Patent: Nov. 13, 2012

(54) SIGNAL-TO-INTERFERENCE + NOISE RATIO ESTIMATOR AND METHOD, MOBILE TERMINAL HAVING THIS ESTIMATOR

(75) Inventors: Andrea Ancora, Nice (FR); Fabrizio Tomatis, Biot (FR); Pierre Demaj, Nice (FR)

(73) Assignee: ST-Ericsson SA, Geneva (CH)

( * ) Notice: Subject to any disclaimer, the term of this patent is extended or adjusted under 35 U.S.C. 154(b) by 1245 days.

(21) Appl. No.: 12/090,018

(22) PCT Filed: Oct. 10, 2006

(86) PCT No.: PCT/IB2006/053713
§ 371 (c)(1),
(2), (4) Date: Apr. 11, 2008

(87) PCT Pub. No.: WO2007/046028
PCT Pub. Date: Apr. 26, 2007

(65) Prior Publication Data
US 2008/0247329 A1    Oct. 9, 2008

(30) Foreign Application Priority Data

Oct. 17, 2005  (EP) .................................. 05300827
Oct. 10, 2006  (WO) .................. PCT/IB2006/053713

(51) Int. Cl.
*H04L 12/26* (2006.01)
*H04L 12/18* (2006.01)
(52) U.S. Cl. ....................................... 370/252; 375/346
(58) Field of Classification Search .................. None
See application file for complete search history.

(56) References Cited

U.S. PATENT DOCUMENTS

| | | | |
|---|---|---|---|
| 6,335,954 B1* | 1/2002 | Bottomley et al. | 375/354 |
| 6,970,795 B1* | 11/2005 | Burgett et al. | 702/85 |
| 7,283,510 B2 | 10/2007 | Ito et al. | |
| 2003/0016740 A1 | 1/2003 | Jeske et al. | |
| 2005/0163194 A1 | 7/2005 | Gore et al. | |
| 2005/0207585 A1* | 9/2005 | Christoph | 381/71.11 |
| 2006/0023775 A1* | 2/2006 | Rimini et al. | 375/150 |
| 2006/0133457 A1* | 6/2006 | Wang et al. | 375/148 |

FOREIGN PATENT DOCUMENTS

WO   2005050865 A2   2/2005

OTHER PUBLICATIONS

Sampath A; et al "Analysis of Signal-To-Interference Ratio Estimation Methods for Wireless Communication Systems" 2001 IEEE International Conference on Communications. (ICC 2001), vol. 1 of 10, Jun. 11, 2001, pp. 2499-2503.

* cited by examiner

*Primary Examiner* — Chirag Shah
*Assistant Examiner* — Minh-Trang Nguyen
(74) *Attorney, Agent, or Firm* — William J. Kubida; Peter J. Meza; Hogan Lovells US LLP

(57) ABSTRACT

The SINR (signal-to-interference+noise ratio) estimator comprises a low-pass filter (66) to filter a variance $\sigma_K$ computed from the received pilot symbol amplitude to obtain an estimated variance $\sigma_K$ with a reduced bias, wherein the low-pass filter has an adjustable coefficient and the estimator comprises an electronic controller able to adjust the value of the adjustable coefficient according to the number of pilot symbols received during a timeslot.

8 Claims, 3 Drawing Sheets

SIGNAL-TO-INTERFERENCE + NOISE RATIO ESTIMATOR AND METHOD, MOBILE TERMINAL HAVING THIS ESTIMATOR

FIELD OF THE INVENTION

The present invention relates to signal-to-interference+noise ratio estimation.

BACKGROUND OF THE INVENTION

Signal-to-Interference+Noise Ratio (SINR) is an important metric of communication link quality. SINR estimation is of particular importance for wireless data systems where resources are shared dynamically amongst users. Some applications of SINR estimates are: a) Power Control in CDMA (Code Division Multiple Access) Systems: the receiver estimates the SINR, compares it to a target and commands the transmitter to increase/decrease its transmitted power; and b) Rate Adaptation: the information bit-rate assigned to a user can be dynamically varied based on its link quality and the system load. While such adaptation has limited use in voice systems, it is extremely useful for wireless data systems. Consequently, inaccurate SINR estimates can severely degrade performance and resource utilization.

Typically, the received signal corresponding to the $j^{th}$ demodulated transmitted pilot symbol in a $k^{th}$ timeslot is defined as $$Y_{kj} = a_{kj}\mu_k + E_{kj} \quad (1)$$

$$j=1, 2, \ldots, N_P$$

where $\mu_k$ represents the received signal amplitude (product of transmitted amplitude and channel gain), $E_{kj}$ is a random variable that represents the noise+interference, $a_{kj}$ represents the demodulated pilot symbol-value, and $N_p$ is the number of pilot symbols received during the timeslot. Pilot symbol values can be +1 or −1 (in BPSK—Binary Phase Shift Keying), while it is assumed (without any loss of generality) that demodulated pilot symbol values are always +1. It is also assumed that the distribution that characterizes the noise+interference is Gaussian with zero mean and variance $\sigma^2$. The SINR in the $k^{th}$ timeslot is then defined as:

$$\theta_k = \frac{\mu_k^2}{\sigma^2} \quad (2)$$

and is the parameter to be estimated.

US 2003/0016740 to Jeske et al. proposes a SINR estimator that improves the SINR estimation accuracy. More precisely, Jeske et al. propose a SINR estimator that smoothes the variance $\sigma_K$ of the pilot symbol amplitude received during a $k^{th}$ timeslot to obtain an estimated variance $\hat{\sigma}_k$ with a reduced bias. The use of the estimated variance $\hat{\sigma}_k$ for the computation of SINR instead of variance $\sigma_K$ increases the SINR accuracy. However, Jeske's estimator can still be improved to further increase the accuracy of the estimated SINR.

SUMMARY OF THE INVENTION

Accordingly, it is an object of the invention to provide a SINR estimator with a better accuracy.

With the foregoing and other objectives in view there is provided, in accordance with the invention, an estimator to estimate a signal-to-interference+noise ratio (SINR) from the amplitude of known pilot symbols received during a timeslot, the estimator comprising a low-pass filter to filter a variance $\sigma_K$ computed from the received pilot symbol amplitudes to obtain an estimated variance $\hat{\sigma}_K$ with a reduced bias, wherein the low-pass filter has an adjustable coefficient and the estimator comprises an electronic controller able to adjust the value of the adjustable coefficient according to the number of pilot symbols received during the timeslot.

It has been observed that to further reduce the bias of the estimated variance $\hat{\sigma}_k$, it is suited to dynamically adjust at least one coefficient of the low-pass filter according to the number $N_P$ of the pilot symbols received during the timeslot. In particular, this improves the operation of such estimator when the number $N_P$ is as low as two pilots per timeslot.

The embodiments of the above estimator may comprise one or several of the following features:

- The low-pass filter comprises a feedback loop so that the estimated variance $\hat{\sigma}_K$ for the $k^{th}$ timeslot depends also on an estimated variance $\hat{\sigma}_{K-1}$ of the previous $(k-1)^{th}$ timeslot;
- The low-pass filter is able to obtain the estimated variance $\hat{\sigma}_K$ which is the result of the following relation:

$$\hat{\sigma}_K = a\sigma_K + b\hat{\sigma}_{K-1}$$

Herein:
- $\sigma_K$ is the variance computed only from pilot symbols received during the $k^{th}$ timeslot,
- $\hat{\sigma}_{K-1}$ is the estimated variance for the $(k-1)^{th}$ timeslot,
- a is a predetermined coefficient, and
- b is the adjustable coefficient.

Coefficient a may be equal to a predetermined value $\alpha$ and the coefficient b value adjusted such that:

$$b = 1 - \alpha + \frac{\alpha}{N_P}$$

Herein, $N_P$ is the number of pilot symbols received during the $k^{th}$ timeslot.

- The low-pass filter is an IIR (Infinite Impulse Response) filter.
- The controller is able to receive the number $N_P$ of pilot symbols from a wireless emitter of a wireless telecommunication system.

The above embodiments of the estimator present the following advantages:
- using a low-pass filter having a feedback loop further reduces the estimated variance bias because the variance $\sigma_K$ of the pilot symbol amplitude cannot vary rapidly from one timeslot to the next one;
- obtaining the estimated variance $\hat{\sigma}_k$ from the relation with coefficient a and b limits the number of computations required to obtain such an estimation; and
- using an IIR filter further reduces the estimated variance bias.

The invention also relates to a mobile terminal comprising the above estimator.

The invention also relates to a method to estimate a signal-to-interference+noise ratio (SINR) from the amplitude of known pilot symbols received during a timeslot, the method comprising:
- a step of filtering, using a low-pass filter, a variance $\sigma_K$ computed from the received pilot symbol amplitudes to obtain an estimated variance $\hat{\sigma}_K$ with a reduced bias, and
- a step of automatically adjusting a coefficient of the low-pass filter according to the number $N_P$ of pilot symbols received during the timeslot.

The embodiment of the above method may comprise the step of receiving the number $N_P$ of pilot symbols from a wireless emitter of a wireless telecommunication system.

These and other aspects of the invention will be apparent from the following description, drawings and claims.

DESCRIPTION OF THE PREFERRED EMBODIMENTS

To simplify the description and the understanding of the described estimator, the following description of embodiments will assume that:

- only Binary Phase Shift Keying (BPSK) modulation is considered although the following disclosure and related analysis can be extended to other signalling schemes;
- noise and interference are modelled together as Additive White Gaussian Noise (AWGN), but as will be appreciated from the following disclosure, this should not limit the application of the following estimation method;
- transmission is organized into fixed duration timeslots, each containing known pilot symbols and data symbols;
- the channel attenuation and phase shift are assumed fixed over a timeslot, and are treated as unknown constants rather than as random variables (no fading assumption).

Figure 1:
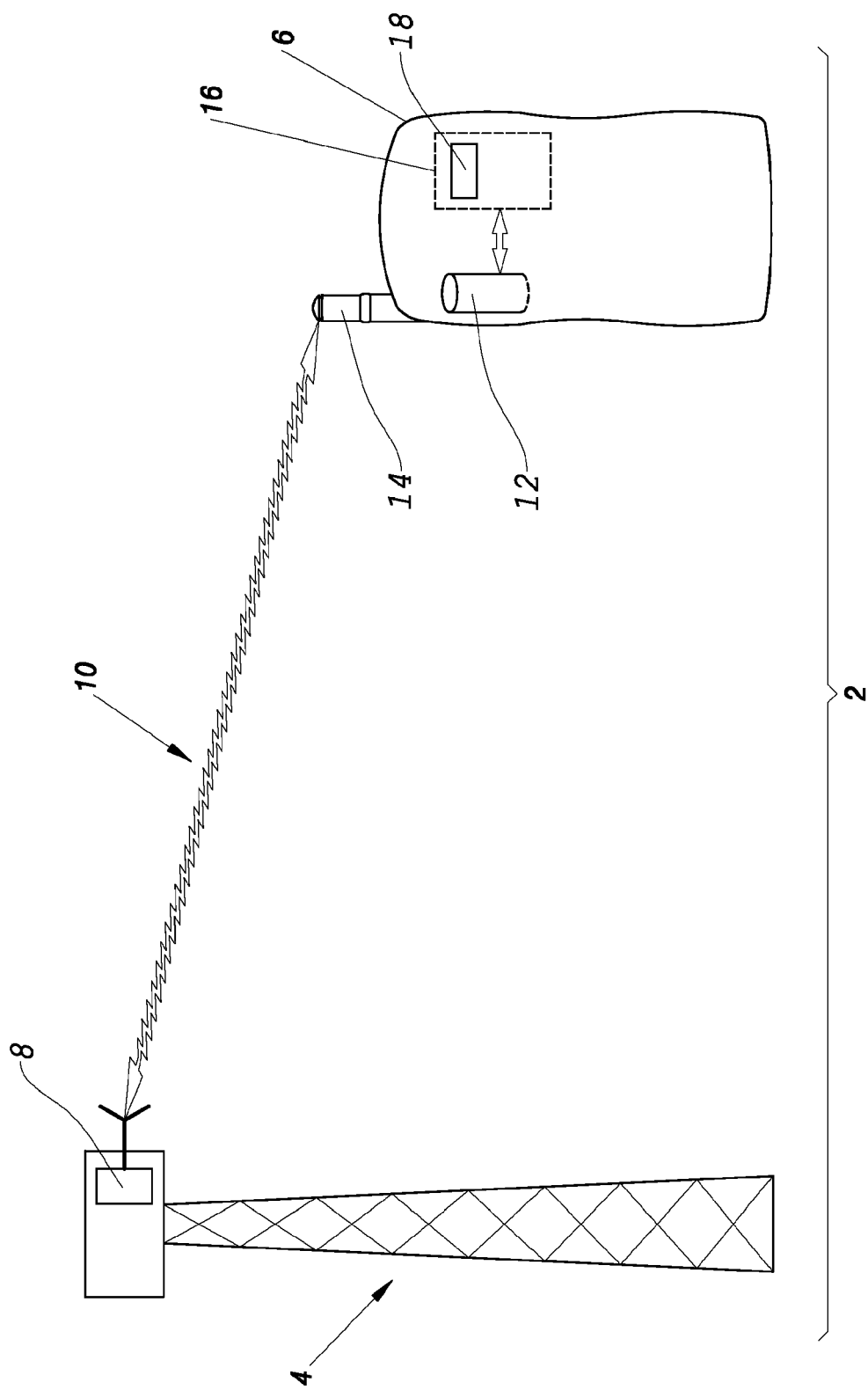
FIG. 1 is a schematic diagram of a part of a wireless communication system.

FIG. 1 shows a part of a wireless communication system 2. For example, system 2 is a CDMA (Code Division Multiple Access) system or a TDMA (Time Division Multiple Access) system. For illustration purposes, system 2 is assumed to be a UMTS (Universal Mobile Telecommunications System).

In the following description, well-known functions or constructions known by a person of ordinary skill in the art are not described in detail.

System 2 has a base station 4 (also know as a node B) and a mobile terminal 6 such as a mobile phone.

Base station 4 has a wireless emitter 8 to transmit a radio signal 10.

Terminal 6 has a radio frequency receiver 12 connected to an antenna 14 to receive the radio signal 10 and to convert it into a baseband signal.

Terminal 6 has also a baseband processor 16 connected to receiver 12 to process the baseband signal.

A SINR estimator 18 is implemented as part of baseband processor 16, for example.

For example, radio signal 10 is divided into 10 ms frames, each frame being divided into 15 timeslots, each timeslot having a duration of $10/15$ ms. Such timeslots are defined in the GSM (Global System for Mobile Communications) or UMTS (Universal Mobile Telecommunications System) standards. During each timeslot, $N_p$ pilot symbols are transmitted. $N_p$ may vary according to the transmission conditions. For example, $N_p$ is chosen from the following group of numbers: $\{2; 4; 8; 16; 32\}$.

Pilot symbols are predetermined symbols, the values of which are known by terminal 6 before they are received. More precisely, terminal 6 knows the expected value of each pilot symbol before this pilot symbol is received.

Figure 2:
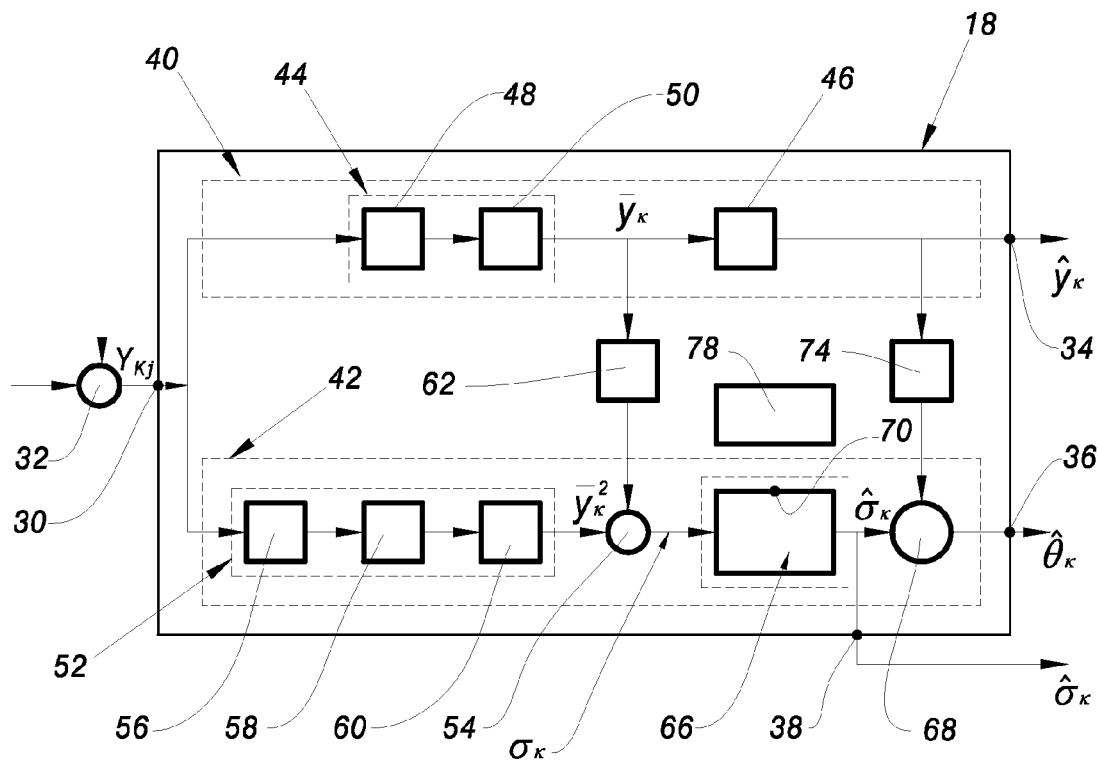
FIG. 2 is a schematic diagram of a SINR estimator used in the system of FIG. 1.

FIG. 2 shows in more details estimator 18.

Estimator 18 has an input 30 to receive demodulated pilot symbols. For example, each demodulated pilot symbol is computed by a multiplier 32 that multiplies the expected value of a pilot symbol by the received value for this pilot symbol.

Estimator 18 has also three outputs 34, 36 and 38 to output an estimation $\hat{Y}_K$ of the mean or average amplitude $\overline{Y}_K$ of the pilot symbol amplitude of the $k^{th}$ timeslot, the SINR estimation $\hat{\theta}_k$ and the variance estimation $\hat{\sigma}_K$, respectively.

Estimator 18 has an upper branch 40 that computes the mean amplitude estimation $\hat{Y}_K$ and a lower branch 42 that computes estimations $\hat{\theta}_k$ and $\hat{\sigma}_K$.

Branch 40 has an averaging module 44 that computes the average amplitude $\overline{Y}_K$ of the demodulated pilot symbol of the $k^{th}$ timeslot and a low-pass filter 46 that computes estimation $\hat{Y}_K$ from mean amplitude $\overline{Y}_K$.

For example, averaging module 44 includes a summer 48 to sum up the amplitudes $Y_{kj}$ of all received demodulated pilot symbols received during the $k^{th}$ timeslot and a divider 50 to divide this sum by the number $N_p$.

Filter 46 is an IIR filter with a feedback loop to take into account the estimation $\hat{Y}_{k-1}$.

Lower branch 42 has an energy calculator 52 to calculate the energy $\overline{Y_K^2}$ of the demodulated pilot symbols received during the $k^{th}$ timeslot and a subtracter 54 to establish variance $\sigma_K$.

Calculator 52 is able to calculate the energy of the demodulated pilot symbols according to the following relation:

$$\overline{Y_K^2} = \frac{1}{N_P}\left(\sum_{j=1}^{N_P} Y_{Kj}^2\right) \qquad (3)$$

For example, calculator 52 has the following units connected in series:

a squaring unit 56 to compute $Y_{Kj}^2$ from the demodulated pilot symbol amplitude $Y_{kj}$;

a summer 58 to calculate the sum $$\left(\sum_{j=1}^{N_P} Y_{Kj}^2\right);$$

and a divider 60 to divide the sum calculated by summer 58 by the number $N_p$ of pilot symbols received during the $k^{th}$ timeslot.

Subtraction unit 54 computes variance $\sigma_K$ according to the following relation:

$$\sigma_K = \overline{Y_K^2} - \overline{Y_K}^2 \qquad (4)$$

Herein, $\overline{Y_K}^2$ is the square of mean amplitude $\overline{Y_K}$.

Estimator 18 has a squaring unit 62 to calculate $\overline{Y_K}^2$ from the mean amplitude $\overline{Y_K}$ output by averaging module 44.

Subtraction unit 54 has one input connected to an output of calculator 52, one input connected to an output of squaring unit 62 and one output to output variance $\sigma_K$.

Lower branch 42 also has an adaptive IIR low-pass filter 66 and a divider 68.

Filter 66 has an input connected to the output of subtraction unit 54 to receive variance $\sigma_K$ and an output to output the estimated variance $\hat{\sigma}_K$.

Filter 66 has at least one adjustable coefficient and an input 70 to receive instructions to adjust the value of the adjustable coefficient.

The output of filter 66 is connected to output 38 of estimator 18.

Figure 3:
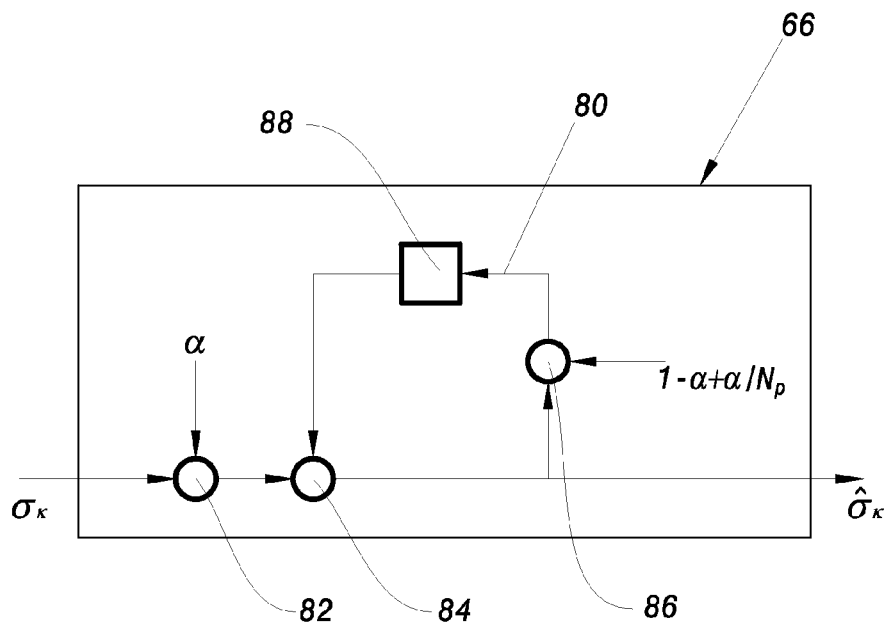
FIG. 3 is a schematic diagram of a low-pass filter used in the estimator of FIG. 2.

Filter 66 is described in more detail in FIG. 3.

Divider 68 is designed to calculate the SINR estimation $\hat{\theta}_K$ according to the following relation:

$$\hat{\theta}_K = (\hat{Y}_K)^2/\hat{\sigma}_K \quad (5)$$

To do so, divider 68 has two inputs: one of them is connected to the output of filter 66 and the other one is connected to the output of a squaring unit 74. Divider 68 has also an output connected to output 36 of estimator 18 to source the SINR estimation $\hat{\theta}_K$.

Squaring unit 74 is able to compute the square $\hat{Y}_K^2$ from the mean amplitude estimation $\hat{Y}_K$ outputted by filter 46.

Estimator 18 also has an electronic controller 78, which is able to adjust the value of the adjustable coefficient of filter 66 according to the value of number $N_p$. Controller 78 has an output connected to input 70.

FIG. 3 shows filter 66 in more detail. Filter 66 has a feedback loop 80 to take into consideration the previously estimated variance $\hat{\sigma}_{K-1}$ in the calculation of variance estimation $\hat{\sigma}_K$.

For example, filter 66 obtains variance estimation $\hat{\sigma}_K$ from variance $\sigma_k$ and estimation $\hat{\sigma}_{K-1}$ according to the following relation:

$$\hat{\sigma}_K = a\sigma_K + b\hat{\sigma}_{K-1} \quad (6)$$

Herein:
a is a predetermined coefficient,
b is the adjustable coefficient, and
$\hat{\sigma}_{K-1}$ is the variance estimation for the previous timeslot, i.e. the $(K-1)^{th}$ timeslot.

For example, a is equal to a constant value $\alpha$. Coefficient b is given by the following relation:

$$b = 1 - \alpha + \frac{\alpha}{N_P} \quad (7)$$

In the illustrated example, filter 66 has:
a multiplier 82 to multiply variance $\sigma_K$ with the predetermined constant value $\alpha$,
a summer 84 to add the term $\alpha.\sigma_K$ to the term $b.\hat{\sigma}_{K-1}$ of relation (6),
a multiplier 86 to multiply estimation $\hat{\sigma}_{K-1}$ with the coefficient $$1 - \alpha + \frac{\alpha}{N_P},$$

and
a delay unit 88 to output estimation $b.\hat{\sigma}_{K-1}$ to an input of summer 84.

Figure 4:
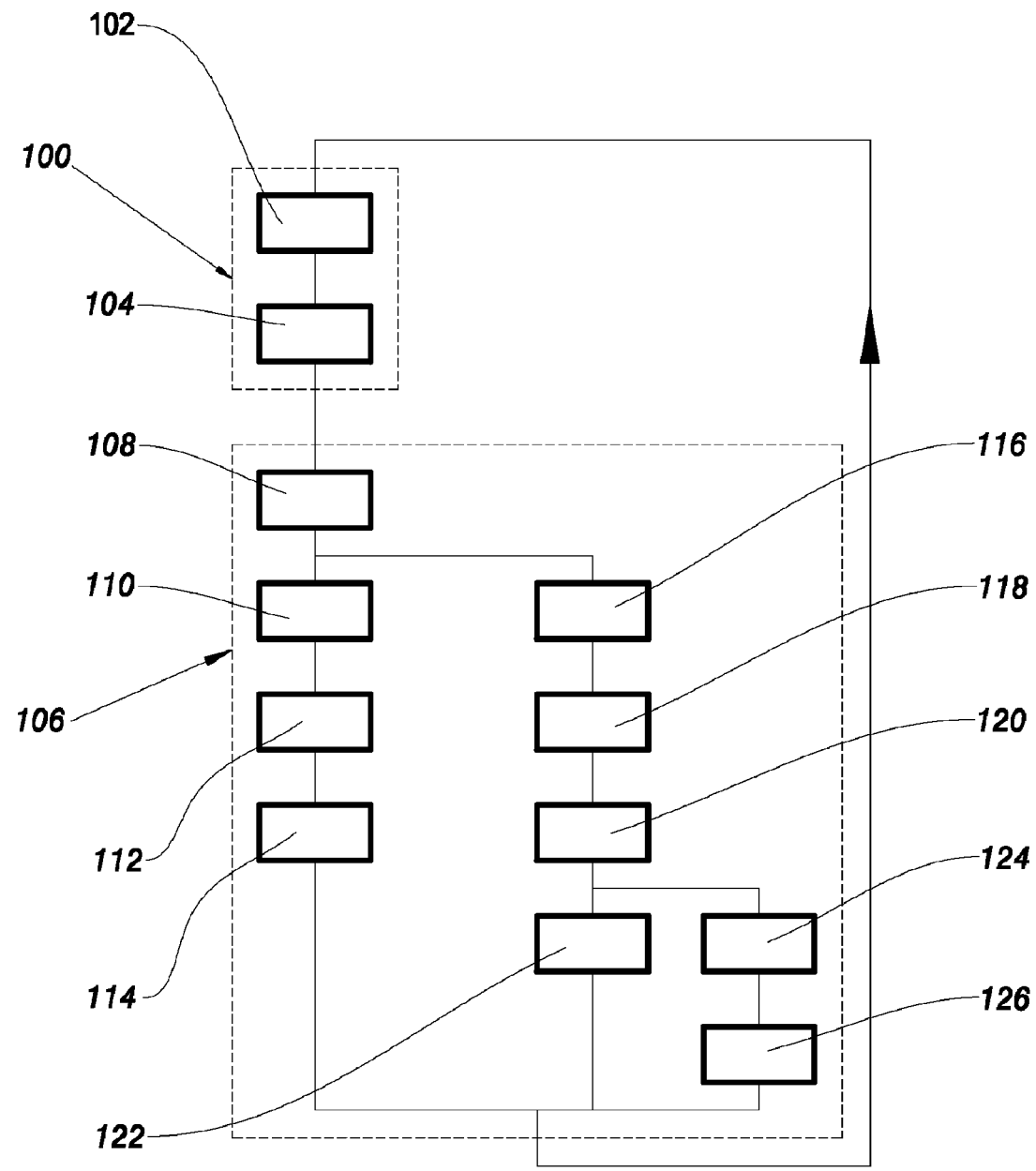
FIG. 4 is a flowchart of a method to estimate a SINR.

The operation of estimator 18 will now be described with reference to FIG. 4.

Initially, during an initialization phase 100, base station 4 transmits, in step 102, the value of number $N_P$ to terminal 6. For example, this transmission takes place during the establishment of a communication link between terminal 6 and base station 4.

In step 104, controller 78 receives the value of number $N_P$ and automatically adjusts the value of coefficient b according to relation (7).

Once the value of coefficient b has been adjusted, during a phase 106, estimator 18 computes the variance estimation $\hat{\sigma}_K$.

At the beginning of phase 106, multiplier 32, in step 108, demodulates the received pilot symbol and outputs to input 30 the demodulated pilot symbol $Y_{kj}$.

In step 110, module 44 computes mean amplitude $\overline{Y}_K$ from the demodulated pilot symbols $Y_{kj}$ received during the $k^{th}$ timeslot.

In step 112, the mean amplitude $\overline{Y}_K$ is filtered by filter 46 to output the mean amplitude estimation $\hat{Y}_K$. The mean amplitude estimation $\hat{Y}_K$ is outputted by estimator 18 in step 114.

In parallel to steps 110 to 114, in step 116, calculator 52 calculates the energy $\overline{Y_K^2}$.

Then, in step 118, subtraction unit 54 computes variance $\sigma_K$ from the outputs of calculator 52 and squaring unit 62.

In step 120, filter 66 filters variance $\sigma_K$ to obtain the variance estimation $\hat{\sigma}_K$ computed according to relation (6).

In step 122, the variance estimation $\hat{\sigma}_K$ is outputted by estimator 18.

In parallel to step 122, in step 124, divider 68 computes the SINR estimation $\hat{\theta}_K$ according to relation (5).

In step 126, the SINR estimation $\hat{\theta}_K$ is outputted by estimator 18.

Many additional embodiments are possible. For example, low-pass filter 66 may be replaced with a low-pass filter which is not an adaptive IIR filter but has at least one adjustable coefficient that can be adjusted by controller 78.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

The invention claimed is:

1. An estimator to estimate a signal-to-interference plus noise ratio SINR from the amplitude of known pilot symbols received from a base station within a wireless communication system, said pilot symbols being received during a timeslot according to $\hat{\theta}_K = (\hat{Y}_K)^2/\hat{\sigma}_K$ wherein $\hat{\theta}_K$ is SINR estimation, and $\overline{Y_K^2}$ is a mean amplitude estimation of pilot symbols, the estimator comprising a low-pass filter to filter an interference plus noise variance $\sigma_K$ computed from the received pilot symbol amplitudes to obtain an estimated variance $\hat{\sigma}_K$ with a reduced bias, wherein the low-pass filter has an adjustable coefficient and the estimator comprises an electronic controller able to adjust the value of the adjustable coefficient according to the number $N_P$ of received pilot symbols being received during the timeslot wherein the low-pass filter comprises a feedback loop so that the estimated variance $\hat{\sigma}_K$ for the $k^{th}$ timeslot depends also on an estimated variance $\hat{\sigma}_{K-1}$ of the previous $(k-1)^{th}$ timeslot.

2. The estimator according to claim 1, wherein the low-pass filter is able to obtain the estimated variance $\hat{\sigma}_K$ as the result of the following relation:

$$\hat{\sigma}_K = a\sigma_K + b\hat{\sigma}_{K-1}$$

wherein:
$\sigma_K$ is the variance computed only from pilot symbols received during the $k^{th}$ timeslot,
$\hat{\sigma}_{K-1}$ is the estimated variance for the $(k-1)^{th}$ timeslot,
a is a predetermined coefficient, and
b is the adjustable coefficient.

3. The estimator according to claim 2, wherein coefficient a is equal to a predetermined value $\alpha$ and the coefficient b value is adjusted so that:

$$b = 1 - \alpha + \frac{\alpha}{N_P}$$

wherein $N_p$ is the number of pilot symbols received during the $k^{th}$ timeslot.

4. The estimator according to claim 1, wherein the low-pass filter is an IIR (Infinite Impulse Response) filter.

5. The estimator according to claim 1, wherein the controller is able to receive the number of $N_p$ of received pilot symbols from a wireless emitter of a wireless telecommunication system.

6. Mobile terminal comprising an estimator according to claim 1 to estimate the SINR used in signal processing.

7. A method to estimate a signal-to-interference plus noise ratio SINR from the amplitude of known pilot symbols received from a base station within a wireless communication system, said pilot symbols being received during a timeslot according to $\hat{\theta}_K = (\hat{Y}_K)^2/\hat{\sigma}_K$ wherein $\hat{\sigma}_K$ is SINR estimation, and $\overline{Y_K^2}$ is a mean amplitude estimation of pilot symbols, the method comprising:

a step of filtering, using a low-pass filter, an interference plus noise variance $\sigma_K$ computed from the amplitudes of the received pilot symbols to obtain an estimated variance $\hat{\sigma}_K$ with a reduced bias, and a step of automatically adjusting a coefficient of the low-pass filter according to the number $N_p$ of received pilot symbols being received during the timeslot wherein the low-pass filter comprises a feedback loop so that the estimated variance $\hat{\sigma}_K$ for the $k^{th}$ timeslot depends also on an estimated variance $\hat{\sigma}_{K-1}$ of the previous $(k-1)^{th}$ timeslot.

8. The method according to claim 7, wherein the method comprises the step of receiving the number $N_p$ of received pilot symbols from a wireless emitter of a wireless telecommunication system.

* * * * *

UNITED STATES PATENT AND TRADEMARK OFFICE
CERTIFICATE OF CORRECTION

PATENT NO. : 8,310,944 B2
APPLICATION NO. : 12/090018
DATED : November 13, 2012
INVENTOR(S) : Andrea Ancora et al.

It is certified that error appears in the above-identified patent and that said Letters Patent is hereby corrected as shown below:

Column 8, line 1, " $\hat{\sigma}_K$ " should be -- $\hat{\theta}_K$ --

Signed and Sealed this
Twenty-second Day of January, 2013

David J. Kappos
*Director of the United States Patent and Trademark Office*